(12) United States Patent
Sines et al.

(10) Patent No.: US 10,982,114 B2
(45) Date of Patent: Apr. 20, 2021

(54) COMPOSITION FOR CONDUCTING MATERIAL REMOVAL OPERATIONS AND METHOD FOR FORMING SAME

(71) Applicant: SAINT-GOBAIN CERAMICS & PLASTICS, INC., Worcester, MA (US)

(72) Inventors: Ian T. Sines, Bellingham, MA (US); Stephen Bottiglieri, Northbridge, MA (US); Douglas E. Ward, Santa Ana, CA (US); Nabil Nahas, Mougins (FR); Mark Hampden-Smith, Chelmsford, MA (US); Steven L. Robare, Scranton, PA (US)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 0 days.

(21) Appl. No.: 16/165,640

(22) Filed: Oct. 19, 2018

(65) Prior Publication Data

US 2019/0119525 A1    Apr. 25, 2019

Related U.S. Application Data

(60) Provisional application No. 62/576,937, filed on Oct. 25, 2017.

(51) Int. Cl.
*C09G 1/02* (2006.01)
*C09G 1/00* (2006.01)
(Continued)

(52) U.S. Cl.
CPC ............... *C09G 1/02* (2013.01); *C09G 1/00* (2013.01); *C09G 1/04* (2013.01); *C09K 3/14* (2013.01); *C09K 3/1454* (2013.01); *C09K 3/1463* (2013.01)

(58) Field of Classification Search
None
See application file for complete search history.

(56) References Cited

U.S. PATENT DOCUMENTS 5,993,686 A    11/1999    Streinz et al.
6,071,614 A    6/2000    Farooq
(Continued)

FOREIGN PATENT DOCUMENTS

| CN | 103146307 A | 6/2013 |
| CN | 105458946 A | 4/2016 |

(Continued)

OTHER PUBLICATIONS

International Search Report and Written Opinion for PCT/US2018/056728, dated Feb. 12, 2019, 10 pages.

*Primary Examiner* — Stephanie P Duclair
(74) *Attorney, Agent, or Firm* — Abel Schillinger, LLP; Adrian Lawrence

(57) ABSTRACT

A composition including a carrier comprising a liquid, an abrasive particulate contained in the carrier, an accelerant contained in the carrier, the accelerant including at least one free anion selected from the group of iodide ($I^-$), bromide ($Br^-$), fluoride ($F^-$), sulfate ($SO_4^{2-}$), sulfide ($S^{2-}$), sulfite ($SO_3^{2-}$), chloride ($Cl^-$), silicate ($SiO_4^{4-}$), phosphate ($PO_4^{3-}$), nitrate ($NO_3^-$), carbonate ($CO_3^{2-}$), perchlorate ($ClO_4^-$), or any combination thereof, and a buffer contained in a saturated concentration in the carrier, the buffer including a compound selected from $M_aF_x$, $N_bF_x$, $M_aN_bF_x$, $M_aI_x$, $N_bI_x$, $M_aN_bI_x$, $M_aBr_x$, $N_bBr_x$, $M_aN_bBr_x$, $M_a(SO_4)_x$, $N_b(SO_4)_x$, $MaN_b(SO_4)_x$, $M_aS_x$, $N_bS_x$, $M_aN_bS_x$, $M_a(SiO_4)_x$, $N_b(SiO_4)_x$, $M_aN_b(SiO_4)_x$, $M_a(PO_4)_x$, $N_b(PO_4)_x$, $M_aN_b(PO_4)_x$, $M_a(NO_3)_x$, $N_b(NO_3)_x$, $M_aN_b(NO_3)_x$, $M_a(CO_3)_x$, $N_b(CO_3)_x$, $M_aN_b(CO_3)_x$, or any combination, (Continued)

wherein M represents a metal element or metal compound;
N represents a non-metal element; and a, b, and x is 1-6.

18 Claims, 1 Drawing Sheet

(51) Int. Cl.
*C09G 1/04* (2006.01)
*C09K 3/14* (2006.01)

(56) References Cited

U.S. PATENT DOCUMENTS

| | | | |
|---|---|---|---|
| 8,163,049 B2 | 4/2012 | Siddiqui | |
| 2002/0019128 A1 | 2/2002 | Lee et al. | |
| 2004/0065864 A1 | 4/2004 | Vogt et al. | |
| 2005/0072524 A1* | 4/2005 | Mueller | C09G 1/02 156/345.11 |
| 2007/0004322 A1 | 1/2007 | Ohashi et al. | |
| 2009/0267020 A1* | 10/2009 | Lee | C09G 1/02 252/79.1 |

FOREIGN PATENT DOCUMENTS

| | | | |
|---|---|---|---|
| CN | 105462504 A | | 4/2016 |
| JP | 2016023216 | * | 2/2016 |
| WO | 9731079 A1 | | 8/1997 |
| WO | 1999067056 A1 | | 12/1999 |
| WO | 2006100043 A2 | | 9/2006 |

* cited by examiner

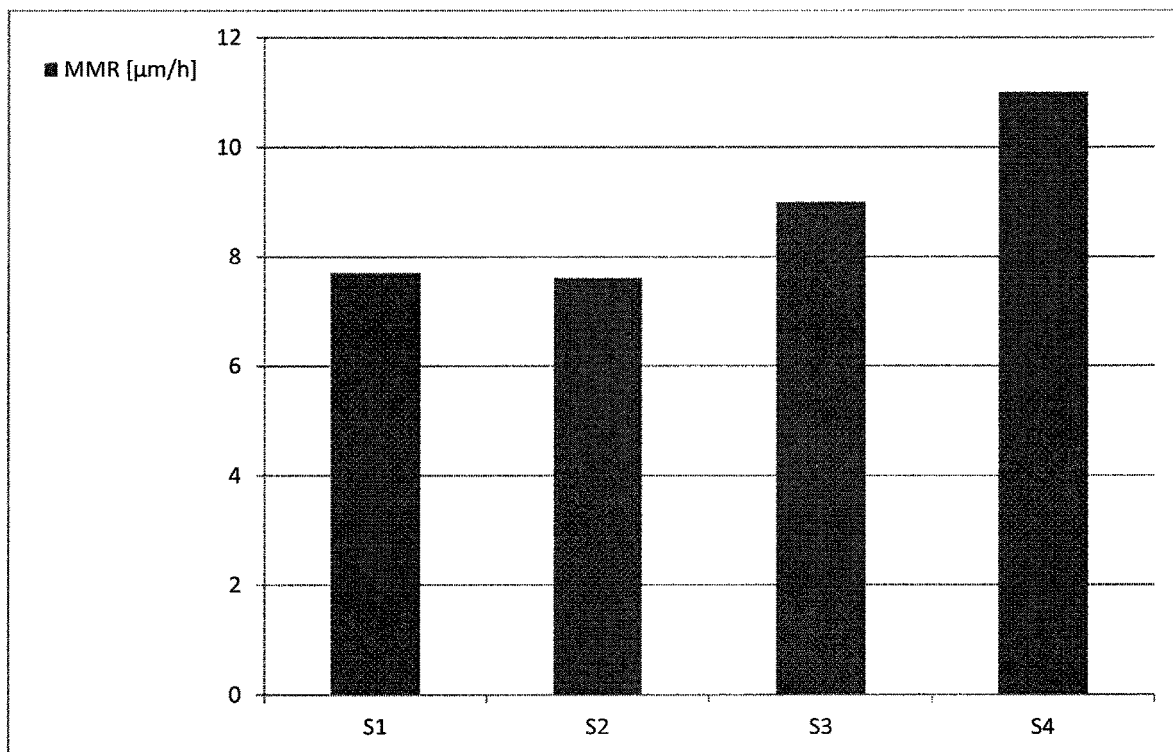

COMPOSITION FOR CONDUCTING MATERIAL REMOVAL OPERATIONS AND METHOD FOR FORMING SAME

CROSS-REFERENCE TO RELATED APPLICATION

This Application claims priority under 35 U.S.C. § 119(e) to U.S. Provisional Application No. 62/576,937, entitled "COMPOSITION FOR CONDUCTING MATERIAL REMOVAL OPERATIONS AND METHOD FOR FORMING SAME," by Ian T. Sines et al., filed Oct. 25, 2017, which is assigned to the current assignee hereof and is incorporated herein by reference in its entirety.

FIELD OF THE INVENTION

The following is directed to a composition, and more particularly, a dry powder composition and/or slurry including a particulate material, an accelerant, and a buffer.

RELATED ART

Compositions for use in material removal operations are known. Such abrasive compositions may include fixed abrasive compositions wherein a collection of abrasive particles are attached to a body or substrate. Alternatively, certain abrasive compositions can include free abrasives, wherein the abrasive particles are not attached to a body or substrate, but are contained within a liquid carrier as a slurry or mixture. Depending upon the type of material removal operation, one may choose to use a fixed abrasive or free abrasive.

Conventional abrasive slurries are most often used in polishing of materials (e.g., glass, metal, etc.), such as in chemical mechanical planarization (CMP). In a typical CMP process, a substrate (e.g., a wafer) is placed in contact with a moving polishing pad, for example, a rotating polishing pad attached to a platen. A CMP slurry, typically an abrasive and chemically reactive mixture, is supplied to the pad during CMP processing of the substrate. Typically, metal CMP slurries contain an abrasive material, such as silica or alumina, suspended in an oxidizing, aqueous medium. The relative movement of the slurry to the substrate assists with the planarization (polishing) process by chemically and mechanically interacting with the substrate film being planarized due to the effect of the movement of the pad relative to the substrate. Polishing is continued in this manner until the desired film on the substrate is removed with the usual objective being to effectively planarize the substrate.

SUMMARY

According to a first aspect, a composition includes a carrier comprising a liquid, an abrasive particulate contained in the carrier, an accelerant contained in the carrier, the accelerant including at least one free anion selected from the group iodide (I$^-$), bromide (Br$^-$), fluoride (F$^-$), sulfate (SO$_4^{2-}$), sulfide (S$^{2-}$), sulfite (SO$_3^{2-}$), chloride (Cl$^-$), silicate (SiO$_4^{4-}$), phosphate (PO$_4^{3-}$), nitrate (NO$_3^-$), carbonate (CO$_3^{2-}$), perchlorate (ClO$_4^-$), or any combination thereof; and a buffer including a compound selected from M$_a$F$_x$, N$_b$F$_x$, M$_a$N$_b$F$_x$, M$_a$I$_x$, N$_b$I$_x$, M$_a$N$_b$I$_x$, M$_a$Br$_x$, N$_b$Br$_x$, M$_a$N$_b$Br$_x$, M$_a$(SO$_4$)$_x$, N$_b$(SO$_4$)$_x$, M$_a$N$_b$(SO$_4$)$_x$, M$_a$S$_x$, N$_b$S$_x$, M$_a$N$_b$S$_x$, M$_a$(SiO$_4$)$_x$, N$_b$(SiO$_4$)$_x$, M$_a$N$_b$(SiO$_4$)$_x$, M$_a$(PO$_4$)$_x$, N$_b$(PO$_4$)$_x$, M$_a$N$_b$(PO$_4$)$_x$, M$_a$(NO$_3$)$_x$, N$_b$(NO$_3$)$_x$, M$_a$N$_b$(NO$_3$)$_x$, M$_a$(CO$_3$)$_x$, N$_b$(CO$_3$)$_x$, M$_a$N$_b$(CO$_3$)$_x$, or any combination thereof, wherein M represents a metal element or metal compound; N represents a non-metal element; and a, b, and x is 1-6, and wherein the buffer is different than the accelerant.

According to another aspect, a composition includes a carrier comprising a liquid, an abrasive particulate contained in the carrier, wherein the abrasive particulate comprises silica, an accelerant contained in the carrier, the accelerant comprising an anion present in a concentration of 0.002 M to 1.0 M, and a buffer contained in the carrier, wherein the buffer has a solubility of less than 10 g/L according to ASTM standard E1148.

In still another aspect, a composition includes a carrier comprising a liquid, an abrasive particulate contained in the carrier, wherein the abrasive particulate comprises silica, an accelerant contained in the carrier, the accelerant comprising fluoride (F$^{1-}$) present in an amount within a range of at least 0.002 M and not greater than 1.0 M, and a buffer contained in the carrier, the buffer comprising MANBFX, wherein the buffer has a solubility less than 10 g/L.

For another aspect, a composition comprises a carrier comprising a liquid, an abrasive particulate contained in the carrier, wherein the abrasive particulate comprises silica, an accelerant contained in the carrier, the accelerant comprising an anion formed from a compound having a solubility of greater than 10 g/L according ASTM standard E1148, and a buffer contained in the carrier, the buffer having a solubility of less than 10 g/L according to ASTM standard E1148.

For another aspect, a composition includes an abrasive particulate comprising silica, an accelerant compound comprising a solubility of at least 10 g/L according to ASTM standard E1148, a buffer having a solubility of less than 10 g/L according to ASTM standard E1148, and a solubility ratio (SA/SB) of at least 1.02, wherein SA represents the solubility of the accelerant and SB represents the solubility of the buffer.

In another aspect, a composition comprises an abrasive particulate an accelerant compound including at least one species selected from the group of iodide (I$^{1-}$), bromide (Br$^{1-}$), fluoride (F$^{1-}$), sulfate (SO$_4^{2-}$), sulfide (S$^{2-}$), sulfite (SO$_3^{2-}$), chloride (Cl$^{1-}$), silicate (SiO$_4^{4-}$), phosphate (PO$_4^{3-}$), nitrate (NO$_3^{1-}$), carbonate (CO$_3^{2-}$), perchlorate (ClO$_4^{1-}$) or any combination thereof, and a buffer selected from M$_a$F$_x$, N$_b$F$_x$, M$_a$N$_b$F$_x$, M$_a$I$_x$, N$_b$I$_x$, M$_a$N$_b$I$_x$, M$_a$Br$_x$, N$_b$Br$_x$, M$_a$N$_b$Br$_x$, M$_a$(SO$_4$)$_x$, N$_b$(SO$_4$)$_x$, M$_a$N$_b$(SO$_4$)$_x$, M$_a$S$_x$, N$_b$S$_x$, M$_a$N$_b$S$_x$, M$_a$(SiO$_4$)$_x$, N$_b$(SiO$_4$)$_x$, M$_a$N$_b$(SiO$_4$)$_x$, M$_a$(PO$_4$)$_x$, N$_b$(PO$_4$)$_x$, M$_a$N$_b$(PO$_4$)$_x$, M$_a$(NO$_3$)$_x$, N$_b$(NO$_3$)$_x$, M$_a$N$_b$(NO$_3$)$_x$, M$_a$(CO$_3$)$_x$, N$_b$(CO$_3$)$_x$, M$_a$N$_b$(CO$_3$)$_x$, or any combination thereof, wherein M represents a metal element or metal compound; N represents a non-metal element; and a, b, and x is 1-6, and wherein the buffer is different than the accelerant.

For another aspect, a composition includes a carrier including a liquid, an abrasive particulate contained in the carrier, an accelerant contained in the carrier, the accelerant including at least one free anion selected from the group of iodide (I$^{1-}$), bromide (Br$^{1-}$), fluoride (F$^{1-}$), sulfate (SO$_4^{2-}$), sulfide (S$^{2-}$), sulfite (SO$_3^{2-}$), chloride (Cl$^{1-}$), silicate (SiO$_4^{4-}$), phosphate (PO$_4^{3-}$), nitrate (NO$_3^{1-}$), carbonate (CO$_3^{2-}$), perchlorate (ClO$_4^{1-}$) or any combination thereof, and a chelating agent including at least one composition selected from the group of dihydroxybenzene disulfonic acid, 2-hydroxy ethyl glycine, ethylenediaminetetraacetic acid, deferoxamine, diethylenetriaminepentaacetic acid, etidronic acid, disodium-4,5-dihydroxy-1,3-benzenedisulfonate, nitrilotriacetic acid, or any combination thereof.

In still another aspect, a polishing slurry configured to polish zirconia-containing materials, the polishing slurry comprises a carrier comprising a liquid, an abrasive particulate contained in the carrier, wherein the slurry can have an average material removal rate of at least 8.0 microns/hr and a surface roughness (Ra) of not greater than 20 Angstroms according to a Zirconia Polishing Test.

BRIEF DESCRIPTION OF THE DRAWINGS

The present disclosure may be better understood, and its numerous features and advantages made apparent to those skilled in the art by referencing the accompanying drawings.

FIG. 1 includes a graph illustrating the material removal rate for different slurry compositions according to embodiments.

DETAILED DESCRIPTION

The following is directed to a composition configured for conducting a material removal operation. For example, the composition or slurry can be used in material removal operations such as polishing. More particularly, the composition or slurry may be used for material removal operations on workpieces of an inorganic material. Some suitable inorganic materials can include ceramic materials. The inorganic materials may be amorphous, monocrystalline, polycrystalline or a combination thereof. According to one particular embodiment, the composition or slurry of the embodiments herein may be suitable for finishing and polishing of decorative ceramic bodies, including for example, bodies including inorganic oxide compounds, including but not limited to, alumina, yttria, zirconia, ceria, and the like. In one particular embodiment, the workpiece may include zirconia, such as a majority content of zirconia. It will be appreciated that other inorganic materials may be present within the workpiece, including but not limited to metals, pigments, borides, carbides, nitrides, and the like. including zirconia. In certain instances, the workpiece may consist essentially of zirconia.

In accordance with one aspect, a composition, such as a dry powder composition may be formed. The dry powder composition can be formed only of powder or particulate materials. The materials may be later placed into a liquid carrier to form a slurry, however, the dry powder composition does not include a liquid carrier. In one aspect, the dry powder composition can include an abrasive particulate, an accelerant compound, and a buffer. As used herein, a buffer relates to a compound which is used in a saturated concentration in the carrier and can partially dissociate in the carrier, but has a lower solubility in the liquid than the accelerant. The presence of the buffer can further enhance the material removal rate of the slurry composition in comparison to the material removal rate of a slurry composition using an accelerator but not a buffer. The buffer of the present disclosure does not necessarily influence or regulate the pH of the slurry composition.

The abrasive particulate may include one or more inorganic compounds, such as oxides, carbides, borides, nitrides, oxyborides, oxycarbides, silica, silicates and the like. In one particular embodiment, the abrasive particulate can include silica or a silicate (e.g., aluminosilicate). In one particular instance, the abrasive particular can include a majority content of silica (e.g., greater than 50% silica). In still another embodiment, the abrasive particulate can consist essentially of silica. The silica may be amorphous or crystalline (e.g., monocrystalline or polycrystalline). Some suitable examples of amorphous silica, which can include a significant content of amorphous phase silica, can be colloidal silica, fumed silica, silica fumes, fused silica or any combination thereof. Some suitable examples of crystalline silica can include quartz, tridymite, crystobalite or any combination thereof.

In certain instances, the abrasive particulate can include less than 1 wt % of certain species, including for example, but not limited to, alumina, zirconia, silicon carbide, diamond, cubic boron nitride, boron carbide, ceria, titania, yttria, rare earth oxides, aluminosilicates, transition metal oxides, or any combination thereof. For one particular embodiment, the abrasive particulate can be free of alumina, zirconia, silicon carbide, diamond, cubic boron nitride, boron carbide, ceria, titania, yttria, rare earth oxides, aluminosilicates, transition metal oxides, or any combination thereof.

In another embodiment, the abrasive particulate can have a certain density that can facilitate use as an abrasive material. For example, the density of the abrasive particulate may be at least 90% theoretical density, or at least 95% theoretical density or at least 90% theoretical density or at least 99% theoretical density.

In another non-limiting embodiment, the abrasive particulate may have a density such as at least 2.3 g/cm$^3$ or at least 2.4 g/cm$^3$ or at least 2.5 g/cm$^3$. Still in one non-limiting embodiment, the abrasive particulate can have a density of not greater than 7.0 g/cm$^3$, such as not greater than 6.8 g/cm$^3$, or not greater than 6.5 g/cm$^3$, or not greater than 6.0 g/cm$^3$, or not greater than 5.5 g/cm$^3$, or not greater than 5.0 g/cm$^3$, or not greater than 4.5 g/cm$^3$, or not greater than 4.0 g/cm$^3$, or not greater than 3.0 g/cm$^3$, or not greater than 2.9 g/cm$^3$, or not greater than 2.8 g/cm$^3$, or not greater than 2.7 g/cm$^3$. It will be appreciated that the density of the abrasive particulate can be within range including any of the minimum and maximum values noted above, including for example a density of at least 2.3 g/cm$^3$ and not greater than 7.0 g/cm$^3$. In a particular aspect, the density of the abrasive particulate can be at least 2.3 g/cm$^3$ and not greater than 4.5 g/cm$^3$.

The abrasive particulate may have a certain particle size distribution that may facilitate use of the abrasive particulate in the composition for use in material removal operations, including polishing processes. For example, the abrasive particulate may have an average particle size (D50) of not greater than 20 microns, such as not greater than 18 microns or not greater than 15 microns or not greater than 12 microns or not greater than 10 microns or not greater than 8 microns or not greater than 6 microns or not greater than 4 microns or not greater than 2 microns or not greater than 1000 nm, such as not greater than 900 nm or not greater than 800 nm or not greater than 700 nm or not greater than 600 nm or not greater than 500 nm or not greater than 400 nm or not greater than 300 nm or not greater than 200 nm or not greater than 100 nm or not greater than 80 nm or not greater than 60 nm or not greater than 40 nm or not greater than 20 nm. Still, in one non-limiting embodiment, the abrasive particulate may have an average particle size (D50) of at least 10 nm, such as at least 20 nm or at least 40 nm or at least 60 nm or at least 80 nm or at least 100 nm or at least 200 nm or at least 300 nm or at least 400 nm or at least 500 nm or at least 600 nm or at least 700 nm or at least 800 nm or at least 1000 nm, or at least 2 microns or at least 3 microns or at least 4 microns or at least 6 microns or at least 8 microns or at least 10 microns or at least 12 microns or at least 14 microns or at least 16 microns. It will be appreciated that the abrasive particulate can have an average particle size (D50) within a range including any of the minimum and maximum values noted above, including for example, within a range including not greater than 20 microns and at least 10 nm.

The particle size distribution of the abrasive particulate may be further defined by a D90-D10 range value, which may facilitate improved performance of the composition and/or slurry. The D90 can represent the particle size value including 90% of the particles sizes in the distribution, such that less than 10% of the particles in the distribution have a size greater than the D90 value. D10 can represent a particle size value wherein only 10% of the particles in the distribution are smaller than the D10 particle size value. The D90-D10 range value describes the breadth of the particle size distribution between the D90 and D10 values. According to one embodiment the D90-D10 value range can be not greater than 20 microns, such as not greater than 18 microns or not greater than 16 microns or not greater than 14 microns or not greater than 12 microns or not greater than 10 microns or not greater than 8 microns or not greater than 6 microns or not greater than 4 microns or not greater than 2 microns or not greater than 1 micron (1000 nm) or not greater than 900 nm or not greater than 800 nm or not greater than 700 nm or not greater than 600 nm or not greater than 500 nm or not greater than 400 nm or not greater than 300 nm or not greater than 200 nm or not greater than 100 nm or not greater than 80 nm or not greater than 60 nm or not greater than 40 nm or not greater than 20 nm or not greater than 10 nm. Still, in another non-limiting embodiment, the D90-D10 range value can't be at least 5 nm, such as at least 10 nm or at least 20 nm or at least 40 nm or at least 60 nm or at least 80 nm or at least 100 nm or at least 200 nm or at least 300 nm or at least 400 nm or at least 500 nm or at least 600 nm or at least 700 nm or at least 800 nm or at least 900 nm or at least 1000 nm or at least 2 microns or at least 3 microns or at least 4 microns or at least 5 microns or at least 6 microns or at least 8 microns or at least 10 microns or at least 12 microns or at least 14 microns or at least 16 microns. It will be appreciated that the D90-D10 range value can be within range including any of the minimum maximum values noted above, including for example, within range of at least 5 nm to not greater than 20 microns.

In one aspect, the dry powder composition can have a particular content of the abrasive particulate that may facilitate improved material removal operations. For example, the abrasive particulate may be present in an amount of at least 50 wt % of the total weight of the dry powder composition, such as at least 60 wt % or at least 70 wt % or at least 80 wt % or at least 90 wt % or at least 92 wt % or at least 94 wt % or at least 95 wt % or at least 96 wt %. Still, in one non-limiting embodiment, the abrasive particulate may be present in an amount of not greater than 99.9 wt % of the total weight of the dry powder composition, such as not greater than 99 wt % or not greater than 98 wt % or not greater than 97 wt % or not greater than 96 wt % or not greater than 95 wt % or not greater than 94 wt % or not greater than 93 wt % or not greater than 92 wt % or not greater than 91 wt % or not greater than 90 wt % or not greater than 85 wt %. It will be appreciated that the abrasive particulate can be present in an amount within a range including any of the minimum and maximum percentages noted above, including for example, within a range of at least 50 wt % and not greater than 99.9 wt %.

The dry powder composition can include an accelerant compound, which may include a compound in a dry powder form. The accelerant compound may be configured to be dissociated within a carrier once the dry powder composition is combined with a liquid carrier. Furthermore, the accelerant compound may have a particular chemistry suitable to facilitate improved material removal capabilities when used in polishing processes. In particular, the accelerant may include one or more species, which may form ionic species in the carrier, and such ionic species (e.g., an anion) may facilitate a chemical interaction with the workpiece during a material removal operation, thus improving the material removal operation. In one embodiment the accelerant compound can include at least one species from the group of iodide ($I^-$), bromide ($Br^-$), fluoride ($F^-$), sulfate ($SO_4^{2-}$), sulfide ($S^{2-}$), sulfite ($SO_3^{2-}$), chloride ($Cl^-$), silicate ($SiO_4^{4-}$), phosphate ($PO_4^{3-}$), nitrate ($NO_{3-}$), carbonate ($CO_3^{2-}$), perchlorate ($ClO_{4-}$) or any combination thereof.

In still another aspect, without wishing to be tied to any particular theory, the accelerant can include only one of the species as noted above. In a more particular embodiment, the accelerant compound can be configured to dissociate in the carrier to form a fluoride ion ($F^{1-}$) or an ionic compound including fluoride.

In certain instances, the accelerant compound may include a material having a particularly high solubility such that the accelerant compound may be fully dissociated or substantially dissociated (i.e., at least 70% or at least 80% or at least 90% of the accelerant compound is dissociated) within the carrier. For example, in one embodiment the accelerant compound can have a solubility of greater than 10 g/L according to ASTM standard E1148. In still other instances, the solubility of the accelerant compound can be greater, such as at least 10.2 g/L or at least 10.5 g/L or at least 11 g/L or at least 12 g/L or at least 14 g/L or at least 16 g/L or at least 18 g/L or at least 20 g/L or at least 25 g/L or at least 30 g/L or at least 40 g/L or at least 50 g/L or at least 60 g/L or at least 70 g/L or at least 80 g/L or at least 90 g/L or at least 100 g/L or at least 200 g/L or at least 300 g/L or at least 400 g/L or at least 500 g/L or at least 600 g/L or at least 700 g/L or at least 800 g/L or at least 900 g/L or at least 1000 g/L. Still, in one non-limiting embodiment, the accelerant compound can have a solubility of not greater than 10,000 g/L, such as not greater than 9000 g/L or not greater than 8000 g/L or not greater than 7000 g/L or not greater than 6000 g/L or not greater than 5000 g/L or not greater than 4000 g/L or not greater than 3000 g/L or not greater than 2000 g/L or not greater than 1000 g/L or not greater than 900 g/L or not greater than 800 g/L or not greater than 700 g/L or not greater than 600 g/L or not greater than 500 g/L or not greater than 400 g/L or not greater than 300 g/L or not greater than 200 g/L or not greater than 100 g/L or not greater than 90 g/L or not greater than 80 g/L or not greater than 70 g/L or not greater than 60 g/L or not greater than 50 g/L. It will be appreciated that the accelerant compound can have a solubility within a range including any of the minimum and maximum values noted above including for example within range of at least or greater than 10 g/L and not greater than 10,000 g/L.

In still another aspect, the accelerant compound may include at least one species from the group of Group 1 elements, Group 2 elements, Group 3 elements, Group 4 elements, Group 5 elements, Group 6 elements, Group 7 elements, Group 8 elements, Group 9 elements, Group 10 elements, Group 11 elements, Group 12 elements, Group 13 elements, Group 14 elements, or any combination thereof. It will be appreciated that reference herein to Groups of elements is reference to Groups as provided in the Periodic Table of Elements by IUPAC via 2016, available at iupac.org/cms/wp-content/uploads/2015/07/IUPAC_Periodic_Table-28Nov16.pdf.

In still more particular instances, the cation of the accelerant compound may be selected from H$^+$, Li$^+$, Na$^+$, K$^+$, Cs$^+$, Be$^{2+}$, Mg$^{2+}$, Ca$^{2+}$, Sr$^{2+}$, Ba$^{2+}$, NH$_{4+}$, Ag$^+$, Mn$^{2+}$, Fe$^{2+}$, Fe$^{3+}$, Co$^{2+}$, Co$^{3+}$, Ni$^{2+}$, Ni$^{3+}$, Cu$^{2+}$, Pb$^{2+}$, Hg$^+$, Hg$^{2+}$, A$^{3+}$, Cr$^+$, Cr$^3$, Cr$^{4+}$, Cr$^{6+}$, or any combination thereof.

In a particular embodiment, the accelerant can include a compound selected from the group of KF, NaF, RbF, NiF$_2$, ZnF$_2$, CoF$_2$, or any combination thereof. In a more particular aspect, the accelerant can be KF.

In another embodiment, the dry powder composition can have a particular content of the accelerant compound that may facilitate improved material removal operations. For example, the accelerant compound may be present in an amount of at least 0.15 wt % of the total weight of the dry powder composition, such as at least 0.2 wt % or at least 0.3 wt % or at least 0.5 wt % or at least 0.8 wt % or at least 1 wt % or at least 2 wt % or at least 3 wt % or at least 5 wt % or at least 7 wt % or at least 10 wt %. Still, in one non-limiting embodiment, the accelerant compound may be present in an amount of not greater than 30 wt % for the total weight of the dry powder composition, such as not greater than 28 wt % or not greater than 25 wt % or not greater than 20 wt % or not greater than 18 wt % or not greater than 15 wt % or not greater than 12 wt % or not greater than 10 wt % or not greater than 8 wt % or not greater than 6 wt % or not greater than 5 wt % or not greater than 4 wt % or not greater than 3 wt % or not greater than 2 wt % or not greater than 1 wt % or not greater than 0.8 wt % or not greater than 0.6 wt % or not greater than 0.5 wt % or not greater than 0.4 wt % or not greater than 0.3 wt %. It will be appreciated that the accelerant compound can be present in an amount within a range including any of the minimum and maximum percentages noted above, including for example, within a range of at least 0.15 wt % and not greater than 30 wt %.

As noted herein, the dry powder composition may further include a buffer. A buffer may include a compound that can facilitate improved material removal operations. More particularly, the buffer may include a compound that may dissociate under certain conditions. The species that result from the dissociation of the buffer may facilitate a chemical interaction with the workpiece and improve the material removal operation. Certain suitable conditions that can facilitate dissociation can include a reduction in the concentration of certain species (e.g., ions) below a threshold concentration in the carrier and/or application of energy (e.g., heat, pressure) to the composition. For example, in certain instances, the buffer may become dissociated when the content of certain accelerant ions species are removed from the carrier. In other instances, the buffer may become dissociated during the material removal operation as the temperature of the composition (i.e., slurry) is increased and/or pressure is applied to the composition. The buffer may be used to maintain a certain minimum content of desirable species in the composition that can facilitate a chemical interaction with the workpiece and facilitate suitable material removal operations.

In accordance with an embodiment, the buffer can include a compound selected from the group of M$_a$F$_x$, N$_b$F$_x$, M$_a$N$_b$F$_x$, M$_a$I$_x$, N$_b$I$_x$, M$_a$N$_b$I$_x$, M$_a$Br$_x$, N$_b$Br$_x$, M$_a$N$_b$Br$_x$, M$_a$(SO$_4$)$_x$, N$_b$(SO$_4$)$_x$, M$_a$N$_b$(SO$_4$)$_x$, M$_a$S$_x$, N$_b$S$_x$, M$_a$N$_b$S$_x$, M$_a$(SiO$_4$)$_x$, N$_b$(SiO$_4$)$_x$, M$_a$N$_b$(SiO$_4$)$_x$, M$_a$(PO$_4$)$_x$, N$_b$(PO$_4$)$_x$, M$_a$N$_b$(PO$_4$)$_x$, M$_a$(NO$_3$)$_x$, N$_b$(NO$_3$)$_x$, M$_a$N$_b$(NO$_3$)$_x$, M$_a$(CO$_3$)$_x$, N$_b$(CO$_3$)$_x$, M$_a$N$_b$(CO$_3$)$_x$, or any combination thereof, wherein M represents a metal element or metal compound; N represents a non-metal element; and a, b, and x is 1-6. In particular instances, M may represent at least one metal element or metal compound selected from the group of Group 1 elements, Group 2 elements, transition metal elements, rare earth elements, or any combination thereof. More particularly, M may represent a metal element or compound from the group of Li, Na, K, Cs, Be, Mg, Ca, Sr, Ba, Ag, Mn, Co, Ni, Cu, Pb, Hg, Al, Cr, Fe, or any combination thereof.

In another embodiment, N may represent at least one non-metal element or non-metal compound from the group of Group 12 elements, Group 13 elements, Group 14 elements, Group 15 elements, or any combination thereof. In accordance with a particular embodiment, N may represent at least one non-metal element or non-metal compound from the group of H, NH$^{4+}$, Hg, Al, Cr, B, Al, Ga, In, Tl, C, Si, Ge, N, P, or any combination thereof.

In one particular embodiment, the buffer can include a compound selected from the group of KBF$_4$, NaBF$_4$, NH$_4$BF$_4$, KPF$_6$, NaPF$_6$, CaF$_2$, MgF$_2$, Na$_3$AlF$_6$, FeF$_3$, LiF, MnF$_2$, AlF$_3$, or any combination thereof. In a more particular embodiment, the buffer can include KBF$_4$, NaBF$_4$, NH$_4$BF$_4$, KPF$_6$, NaPF$_6$, or any combination thereof. More particularly, in certain instances, the buffer may include KBF$_4$, and more particularly, the buffer may consist essentially of KBF$_4$.

In one aspect, the dry powder can include as accelerant KF and as buffer KBF$_4$. In a particular aspect, the dry powder can consist essentially of silica, KF, and KBF$_4$.

The buffer may have a particular solubility within the carrier such that the dissociation of the buffer is controlled. More particularly, the buffer may have a solubility that can be less than the solubility of the accelerant compound. In such instances, the solubility and dissociation of the buffer in the carrier can be controlled relative to the dissociation of the accelerant in the carrier. In accordance with an embodiment, the buffer can have a solubility of less than 10 g/L according to ASTM standard E1148. In still other embodiments the buffer may have a solubility of not greater than 9.5 g/L, such as not greater than 9.2 g/L or not greater than 9 g/L or not greater than 8.5 g/L or not greater than 8 g/L or not greater than 7.5 g/L or not greater than 7 g/L or not greater than 6.5 g/L or not greater than 6 g/L or not greater than 5.5 g/L or not greater than 5 g/L or not greater than 4.5 g/L or not greater than 4 g/L or not greater than 3.5 g/L or not greater than 3 g/L or not greater than 2.5 g/L or not greater than 2 g/L or not greater than 1.5 g/L or not greater than 1 g/L or not greater than 0.5 g/L or not greater than 0.1 g/L or not greater than 0.05 g/L. Still in one non-limiting embodiment, the buffer can have a solubility of at least 0.001 g/L and not greater than 10.0 g/l, such as at least 0.005 g/L, or at least 0.01 g/L or at least 0.05 g/L or at least 0.1 g/L or at least 0.5 g/L or at least 1 g/L or at least 1.5 g/L or at least 2 g/L or at least 2.5 g/L or at least 3 g/L or at least 3.5 g/L or at least 4 g/L or at least 4.5 g/L or at least 5 g/L or at least 5.5 g/L or at least 6 g/L or at least 6.5 g/L or at least 7 g/L or at least 7.5 g/L or at least 8 g/L or at least 8.5 g/L or at least 9 g/L and not greater than 10.0 g/l. It will be appreciated that the buffer can have a solubility within a range including any of the minimum and maximum values noted above, including for example, a solubility within a range of at least 0.001 g/L to not greater than 10 g/L.

The buffer may be a material that facilitates controlled dissociation of the components of the buffer. In particular instances, the dissociation may be controlled over a certain period of time, such that the dissociation of the buffer can be released at a given rate over a certain duration. In particular instances, the buffer can be dissociated during use at a controlled rate. In such instances, one or more environmental factors associated with the use of the slurry may facilitate the controlled time-release capabilities of the buffer. Furthermore, the buffer may include one or more components, such as a coating, that may facilitate controlled dissociation of the buffer during a material removal operation.

In another embodiment, the dry powder composition can have a particular content of the buffer that may facilitate improved material removal operations. For example, the buffer may be present in an amount of at least 0.15 wt % of the total weight of the dry powder composition, such as at least 0.2 wt % or at least 0.3 wt % or at least 0.5 wt % or at least 0.8 wt % or at least 1 wt % or at least 2 wt % or at least 3 wt % or at least 5 wt % or at least 7 wt % or at least 10 wt % or at least 12 wt % or at least 15 wt % or at least 20 wt % or at least 25 wt %. Still, in one non-limiting embodiment, the buffer may be present in an amount of not greater than 30 wt % of the total weight of the dry powder composition, such as not greater than 28 wt % or not greater than 25 wt % or not greater than 20 wt % or not greater than 18 wt % or not greater than 15 wt % or not greater than 12 wt % or not greater than 10 wt % or not greater than 8 wt % or not greater than 6 wt % or not greater than 5 wt % or not greater than 4 wt % or not greater than 3 wt % or not greater than 2 wt % or not greater than 1 wt % or not greater than 0.8 wt % or not greater than 0.6 wt % or not greater than 0.5 wt % or not greater than 0.4 wt % or not greater than 0.3 wt %. It will be appreciated that the buffer can be present in an amount within a range including any of the minimum and maximum values noted above, including for example, within a range of at least 0.15 wt % and not greater than 30 wt %.

In another aspect, the buffer can be a compound that may include a species that is the same as a species contained in the accelerant compound. More particularly, the buffer can be a compound including a species configured to dissociate in the carrier and for a buffer anion species that is the same as an accelerant anion species, wherein the accelerant anion species is formed from the accelerant compound upon dissociation of the accelerant compound in the carrier. For example, in one embodiment the accelerant compound can include a fluoride containing compound that is configured to form a free fluoride anion upon dissociation of the accelerant compound in the carrier. In such instances, the buffer may be a compound including also a fluoride containing compound, and which may dissociate to form a free fluoride anion in the carrier under certain conditions.

In still another embodiment, the buffer can be a compound including a species that is different than a species contained within the accelerant compound. More particularly, the buffer can be a compound including at least one species configured to form an anion species upon dissociation of the buffer in the carrier, and such an anion species may be different from the anion species formed from dissociation of the accelerant in the carrier. For example, the accelerant may include a fluoride containing salt, such that when the accelerant is dissociated a fluoride anion is formed within the carrier and the buffer may include a bromide containing salt that is configured to form a bromide anion when the buffer is dissociated within the liquid carrier.

It will be appreciated that the dry powder composition may include other compounds in the form of additives. For example, certain optional additives can include oxidizers, dispersants, surfactants, lubricants, or any combination thereof. Some suitable examples of oxidizers can include peroxides (e.g., $H_2O_2$), persulfides (e.g., $H_2S_2$), perchlorates (e.g., $KClO_4$), periodates (e.g., $KIO_4$), perbromates (e.g., $KBrO_4$), permanganates (e.g., $KMnO_4$), chromates (e.g., $K_3CrO_8$), ceric ammonium nitrates (e.g., $(NH_4)_2Ce(NO_3)_6$), ferrocyanides (e.g., $K_4Fe(CN)_6$) or any combination thereof. Some suitable examples of dispersants include sodium hexametaphosphate, polyvinylpyrrolidone, sodium polynaphthalene sulfonate, sodium polymethacrylate, ammonium polymethacrylate, sodium polyacrylate, ammonium polyacrylate, sodium lignosulfonate. Some suitable examples of surfactants can include oleic acid, cetyltrimethylammonium bromide, dodecanthiol, oleylamine, sodium dodecyl sulfate, hydroxyl phosphono-acetic acid or any combination thereof. Some suitable examples of lubricants can include fluorosurfactants, zinc stearate, manganese dioxide, molybdenum disulfide, aluminosilicates, organosilicone copolymers or any combination thereof.

In accordance with another embodiment, the dry powder composition may be free of any additives such as an oxidizer, dispersant, surfactant, lubricant, or any comminution thereof. In one particular embodiment, the composition may include only the abrasive particulate, the accelerant, and the buffer.

After forming the dry powder composition, it may be shipped to a customer, and the customer may add a liquid carrier to create a polishing composition in the form of a slurry. However in other instances, the dry powder composition can be dispersed within a liquid carrier prior to being sent to a customer. Some suitable examples of liquid carriers can include polar or non-polar liquid materials. In one embodiment, the carrier can include water, and may consist essentially of water, and more particularly, may consist essentially of deionized water.

The composition may include a particular content of the carrier to facilitate suitable formation of the slurry composition. For example the carrier can be present in amount of at least 45 wt % for a total weight of the composition including the carrier, abrasive particulate, accelerant, buffer, and any additives. In other instances, the content of the carrier can be greater, such as at least 50 wt %, such as at least 55 wt % or 60 wt % or at least 65 wt % or at least 70 wt % or at least 75 wt % or at least 80 wt % for a total weight of the composition. Still in another non-limiting embodiment, the carrier can be present in amount of not greater than 97 wt % for total weight of the composition, such as not greater than 95 wt % or not greater than 90 wt % or not greater than 85 wt % or not greater than 80 wt % or not greater than 75 wt % or not greater than 70 wt %. It will be appreciated that the content of the carrier can be within range including any of the minimum and maximum percentages noted above.

The composition may include a particular content of the abrasive particulate to facilitate suitable formation of the slurry composition. For example the abrasive particulate can be present in amount of at least 2 wt % for a total weight of the composition including the carrier, abrasive particulate, accelerant, buffer, and any additives. In other instances, the content of the abrasive particulate can be greater, such as at least 5 wt %, such as at least 10 wt % or 15 wt % or at least 20 wt % or at least 25 wt % or at least 30 wt % or at least 35 wt % for a total weight of the composition. Still in another non-limiting embodiment, the abrasive particulate can be present in amount of not greater than 80 wt % for total weight of the composition, such as not greater than 60 wt % or not greater than 50 wt % or not greater than 40 wt % or not greater than 30 wt % or not greater than 25 wt % or not greater than 20 wt %. It will be appreciated that the content of the abrasive particulate can be within range including any of the minimum and maximum percentages noted above.

Upon the addition of the carrier to the dry powder composition at least a portion of the accelerant compound may become dissociated and form at least one free accelerant cation species and one free accelerant anion species. In particular instances, the entirety of the accelerant compound may become dissociated such that only free ionic species formed from the accelerant compound are in the slurry composition and the slurry composition may not contain any undissolved particulate of the accelerant compound. In accordance with one embodiment, the accelerant can include at least one free anion selected from the group of iodide ($I^{1-}$), bromide ($Br^{1-}$), fluoride ($F^{1-}$), sulfate ($SO_4^{2-}$), sulfide ($S^{2-}$), sulfite ($SO_3^{2-}$), chloride ($Cl^{1-}$), silicate ($SiO_4^{4-}$), phosphate ($PO_4^{3-}$), nitrate ($NO_3^{1-}$), carbonate ($CO_3^{2-}$), hydroxide ($OH^{1-}$), perchlorate ($ClO_4^{1-}$) or any combination thereof. In a more particular embodiment, the accelerant anion can consist essentially of fluoride ($F^{1-}$).

The accelerant may be present in a certain concentration that may facilitate improved performance of the slurry composition during a material removal operation. In particular, the accelerant may be a free anion having a certain molarity in the liquid carrier. For example, the accelerant may be present in a concentration of at least 0.003 mol/liter (M) or at least 0.004 M or at least 0.005 M or at least 0.006 M or at least 0.007 M or at least 0.008 M or at least 0.009 M or at least 0.01 M or at least 0.02 M or at least 0.03 M or at least 0.04 M or at least 0.05 M or at least 0.06 M or at least 0.07 M or at least 0.08 M or at least 0.09 M or at least 0.1 M or at least 0.2 M or at least 0.3 M or at least 0.4 M or at least 0.5 M or at least 0.6 M or a least 0.7 M or at least 0.8 M or at least 0.9 M. Still in one non-limiting embodiment, the accelerant maybe present in a concentration of not greater than not greater than 1.0 M or not greater than 0.9 M or not greater than 0.8 M or not greater than 0.7 M or not greater than 0.6 M or not greater than 0.5 M or not greater than 0.4 M or not greater than 0.3 M or not greater than 0.2 M or not greater than 0.1 M or not greater than 0.09 M or not greater than 0.08 M or not greater than 0.07 M or not greater than 0.06 M or not greater than 0.05 M or not greater than 0.04 M or not greater than 0.03 M or not greater than 0.02 M or not greater than 0.01 M or not greater than 0.009 M or not greater than 0.008 M or not greater than 0.007 M or not greater than 0.006 M or not greater than 0.005 M or not greater than 0.004 M or not greater than 0.003 M. It will be appreciated that the accelerant can be present in a concentration within a range including any of the minimum and maximum values noted above, including for example within range of at least 0.002 M to not greater than 1.0 M.

The accelerant species (i.e., anion species) can be formed from an accelerant compound having a particular solubility as described herein. As such, the accelerant can be formed from a compound having the solubility of the dry powder accelerant compound as noted in embodiments herein.

As noted herein, the accelerant compound can be dissociated in the liquid carrier and separate into a cation and anion species within the liquid carrier. Accordingly, the slurry composition including the liquid carrier can include at least one cation species (i.e., element or compound) selected from the group consisting of Group 1 elements, Group 2 elements, Group 3 elements, Group 4 elements, Group 5 elements, Group 6 elements, Group 7 elements, Group 8 elements, Group 9 elements, Group 10 elements, Group 11 elements, Group 12 elements, Group 13 elements, Group 14 elements, or any combination thereof. In more particular instances, the slurry composition may include a cation species within the carrier selected from the group of $H^+$, $Li^+$, $Na^+$, $K^+$, $Cs^+$, $Be^{2+}$, $Mg^{2+}$, $Ca^{2+}$, $Sr^{2+}$, $Ba^{2+}$, $NH_4^+$, $Ag^+$, $Mn^{2+}$, $Fe^{2+}$, $Fe^{3+}$, $Co^{2+}$, $Co^{3+}$, $Ni^{2+}$, $Ni^{3+}$, $Cu^{2+}$, $Pb^{2+}$, $Hg^+$, $Hg^{2+}$, $Al^{3+}$, $Cr^{2+}$, $Cr^{3+}$, $Cr^{4+}$, $Cr^{6+}$, or any combination thereof.

The cation species may be present in a certain concentration within the slurry composition. For example, the cation species may be present in a concentration of at least 0.003 M or at least 0.004 M or at least 0.005 M or at least 0.006 M or at least 0.007 M or at least 0.008 M or at least 0.009 M or at least 0.01 M or at least 0.02 M or at least 0.03 M or at least 0.04 M or at least 0.05 M or at least 0.06 M or at least 0.07 M or at least 0.08 M or at least 0.09 M or at least 0.1 M or at least 0.2 M or at least 0.3 M or at least 0.4 M or at least 0.5 M or at least 0.6 M or a least 0.7 M or at least 0.8 M or at least 0.9 M. Still in one non-limiting embodiment, the cation species maybe present in a concentration of not greater than not greater than 1.0 M or not greater than 0.9 M or not greater than 0.8 M or not greater than 0.7 M or not greater than 0.6 M or not greater than 0.5 M or not greater than 0.4 M or not greater than 0.3 M or not greater than 0.2 M or not greater than 0.1 M or not greater than 0.09 M or not greater than 0.08 M or not greater than 0.07 M or not greater than 0.06 M or not greater than 0.05 M or not greater than 0.04 M or not greater than 0.03 M or not greater than 0.02 M or not greater than 0.01 M or not greater than 0.009 M or not greater than 0.008 M or not greater than 0.007 M or not greater than 0.006 M or not greater than 0.005 M or not greater than 0.004 M or not greater than 0.003 M. It will be appreciated that the cation species can be present in a concentration within a range including any of the minimum and maximum values noted above, including for example within range of at least 0.002 M to not greater than 1.0 M.

As the buffer is incorporated into the liquid carrier at least a portion of the buffer may become dissociated. However, a significant content of the buffer may be maintained as a compound and may not be dissociated within the liquid carrier.

Notably, the buffer can be configured to dissociate after certain conditions are achieved or encountered. In particular instances, the buffer can be configured to maintain a certain minimum concentration of an anion species, such as an accelerant species, within the liquid carrier to facilitate chemical interaction with the workpiece during a material removal operation. According to one embodiment, the slurry can include at least 0.01 wt % of the buffer for the total content of the slurry composition, such as at least 0.05 wt % or at least 0.08 wt % or at least 0.1 wt % or at least 0.15 wt % or at least 0.2 wt % or at least 0.25 wt % or at least 0.3 wt % or at least 0.35 wt % or at least 0.4 wt % or at least 0.45 wt % or at least 0.5 wt % or at least 0.55 wt % or at least 0.6 wt % or at least 0.65 wt % or at least 0.7 wt % or at least 0.75 wt % or at least 0.8 wt % or at least 0.85 wt % or at least 0.9 wt % or at least 1 wt % or at least 1.5 wt % or at least 2 wt % or at least 2.5 wt % or at least 3 wt % or at least 3.5 wt % or at least 4 wt % or at least 4.5 wt % or at least 5 wt % or at least 5.5 wt % or at least 6 wt % or at least 6.5 wt % or at least 7 wt % or at least 8 wt % or at least 8.5 wt % or at least 9 wt %. Still, in one non-limiting embodiment, the amount of the buffer in the slurry composition can be not greater than 10 wt % for the total weight of the slurry composition, such as not greater than 9 wt % or not greater than 8 wt % or not greater than 7 wt % or not greater than 6 wt % or not greater than 5 wt % or not greater than 4 wt % or not greater than 3 wt % or not greater than 2 wt % or not greater than 1 wt % or not greater than 0.9 wt % or not greater than 0.8 wt % or not greater than 0.6 wt % or not greater than 0.4 wt % or not greater than 0.2 wt % or not greater than 0.1 wt %. It will be appreciated that the content of the buffer can be within range including any of the minimum and maximum percentages noted above, including for example, within a range of at least 0.01 wt % and not greater than 10 wt %.

In still another embodiment, the slurry composition including the carrier and the dry powder composition may have a particular pH that can facilitate improved material removal operations. For example, the slurry composition may have a pH of at least 8, such as at least 9 or at least 10 or at least 11. Still in other embodiments, the pH of the slurry maybe not greater than 12, such as not greater than 11 or not greater than 10 or not greater than 9. It will be appreciated the pH of the slurry composition may be within range including any of the minimum and maximum values noted above, including for example, a pH within range of at least 8 and not greater than 12.

In accordance with one embodiment the slurry composition may include any one of the optional additives noted herein, including for example, but not limited to, oxidizers, dispersants, surfactants, lubricants, or any combination thereof. Still, in another non-limiting embodiment, the composition may be free of any optional additives including at least an oxidizer, dispersant, surfactant, lubricant, or any combination thereof. The slurry composition may include only the liquid carrier, abrasive particulate, accelerant, and buffer. In a particular embodiment, the slurry may consist essentially of abrasive silica particles, water, KF and $KBF_4$.

In accordance with another embodiment, the slurry composition can be configured to have an average material removal rate of at least 8.0 μm/h according to a Zirconia Polishing Test as described herein. In another embodiment, the average material removal rate of the slurry composition can be at least 8.3 μm/h, such as at least 8.5 μm/h, or at least 8.7 μm/h, or at least 9 μm/h, or at least 9.3 μm/h, or at least 9.5 μm/h, or at least 9.7 μm/h, or at least 10 μm/h. Still, in another embodiment, the average material removal rate of the slurry composition maybe not greater than 30 μm/h, such as not greater than 20 μm/h or not greater than 15 μm/h or not greater than 12 μm/h according to the Zirconia Polishing Test. It will be appreciated that the slurry composition may have an average material removal rate within a range including any of the minimum and maximum values noted above, including for example, an average material removal rate of at least 8.0 μm/h not greater than 30 μm/h, or at least 8.5 μm/h to not greater than 15 μm/h.

In still another embodiment, the slurry composition may be characterized as having a particular surface roughness (Ra) factor according to the Zirconia Polishing Test. For example, the slurry composition can have a surface roughness factor of less than 20 Å, such as not greater than 19 Å or not greater than 18 Å or not greater than 17 Å or not greater than 16 Å or not greater than 15 Å or not greater than 12 Å or not greater than 10 Å or not greater than 8 Å or not greater than 6 Å or not greater than 4 Å or not greater than 2 Å. Still, in one non-limiting embodiment, the slurry composition can have a surface roughness factor of at least 0.5 Å according to the Zirconia Polishing Test, such as at least 0.8 Å or at least 1 Å or at least 2 Å or at least 3 Å or at least 5 Å or at least 8 Å or at least 10 Å or at least 12 Å or at least 15 Å. It will be appreciated that the surface finish can be within range including any of the minimum and maximum values noted above, including for example, not less than 20 Å and at least 0.5 Å.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

EMBODIMENTS

Embodiment 1

A composition comprising:
a carrier comprising a liquid;
an abrasive particulate contained in the carrier;
an accelerant contained in the carrier, the accelerant including at least one free anion selected from the group of iodide ($I^-$), bromide ($Br^-$), fluoride ($F^-$), sulfate ($SO_4^{2-}$), sulfide ($S^{2-}$), sulfite ($SO_3^{2-}$), chloride ($Cl^-$), silicate ($SiO_4^{4-}$), phosphate ($PO_4^{3-}$), nitrate ($NO_3^-$), carbonate ($CO_3^{2-}$), perchlorate ($ClO_4^-$), or any combination thereof; and
a buffer contained in a saturated concentration in the carrier, the buffer including a compound selected from $M_aF_x$, $N_bF_x$, $M_aN_bF_x$, $M_aI_x$, $N_bI_x$, $M_aN_bI_x$, $M_aBr_x$, $N_bBr_x$, $M_aN_bBr_x$, $M_a(SO_4)_x$, $N_b(SO_4)_x$, $M_aN_b(SO_4)_x$, $M_aS_x$, $N_bS_x$, $M_aN_bS_x$, $M_a(SiO_4)_x$, $N_b(SiO_4)_x$, $M_aN_b(SiO_4)_x$, $M_a(PO_4)_x$, $N_b(PO_4)_x$, $M_aN_b(PO_4)_x$, $M_a(NO_3)_x$, $N_b(NO_3)_x$, $M_aN_b(NO_3)_x$, $M_a(CO_3)_x$, $N_b(CO_3)_x$, $M_aN_b(CO_3)_x$, or any combination thereof, wherein M represents a metal element or metal compound; N represents a non-metal element; and a, b, and x is 1-6, and wherein the buffer is different than the accelerant.

Embodiment 2

A composition comprising:
a carrier comprising a liquid;
an abrasive particulate contained in the carrier;
an accelerant contained in the carrier, the accelerant comprising free anions present in a concentration of 0.002 M to 1.0 M; and
a buffer contained in the carrier, wherein the buffer has a solubility of less than 10 g/L according to ASTM standard E1148.

Embodiment 3

A composition comprising:
a carrier comprising a liquid;
an abrasive particulate contained in the carrier, wherein the abrasive particulate comprises silica;
an accelerant contained in the carrier, the accelerant comprising free fluoride ions ($F^{1-}$) present in an amount within a range of at least 0.002 M and not greater than 1.0 M; a buffer contained in the carrier, the buffer comprising $M_aN_bF_x$, wherein M is a metal element, N is a non-metal element, and a, b, x are 1-6, and wherein the buffer has a solubility less than 10 g/L.

Embodiment 4

A composition comprising:
a carrier comprising a liquid;
an abrasive particulate contained in the carrier, wherein the abrasive particulate comprises silica;
an accelerant contained in the carrier, the accelerant comprising an anion formed from a compound having a solubility of greater than 10 g/L according ASTM standard E1148;
a buffer contained in the carrier, the buffer having a solubility of less than 10 g/L according to ASTM standard E1148.

Embodiment 5

The composition of any one of embodiments 1, 2, 3, and 4, wherein the carrier comprises water, wherein the carrier consists essentially of water, wherein the carrier consists essentially of deionized water.

Embodiment 6

The composition of any one of embodiments 1, 2, 3, and 4, wherein the carrier is present in an amount of at least 45 wt % for a total weight of the composition, or at least 50 wt % or at least 55 wt % or at least 60 wt % or at least 65 wt % or at least 70 wt % or at least 75 wt % or at least 80 wt %.

Embodiment 7

The composition of any one of embodiments 1, 2, 3, and 4, wherein the carrier is present in an amount of not greater than 97 wt % for a total weight of the composition or not greater than 95 wt % or not greater than 90 wt % or not greater than 85 wt % or not greater than 80 wt % or not greater than 75 wt % or not greater than 70 wt %.

Embodiment 8

The composition of any one of embodiments 1, 2, 3, and 4, wherein the abrasive particulate comprises an average particle size (D50) of not greater than 20 microns and at least 10 nm.

Embodiment 9

The composition of any one of embodiments 1, 2, 3, and 4, wherein the abrasive particulate comprises a D90-D10 range value of at least 5 nm to not greater than 20 microns.

Embodiment 10

The composition of any one of embodiments 1, 2, 3, and 4, wherein the abrasive particulate comprises at least one of fused silica, colloidal silica, quartz, fumed silica, silica fumes, or any combination thereof.

Embodiment 11

The composition of any one of embodiments 1, 2, 3, and 4, wherein the abrasive particulate includes a majority content of silica, wherein the abrasive particulate consists essentially of silica.

Embodiment 12

The composition of any one of embodiments 1, 2, 3, and 4, wherein the abrasive particulate includes less than 1 wt % of alumina, zirconia, silicon carbide, diamond, cubic boron nitride, boron carbide, ceria, titania, yttria, rare earth elements, aluminosilicates, transition metal elements, iron oxide, or any combination thereof.

Embodiment 13

The composition of any one of embodiments 1, 2, 3, and 4, wherein the abrasive particulate comprises a density of at least 90% theoretical density or at least 95% theoretical density or at least 98% theoretical density or at least 99% theoretical density.

Embodiment 14

The composition of any one of embodiments 1, 2, 3, and 4, wherein the abrasive particulate comprises a density of at least 2.3 g/cm$^3$ or at least 2.4 g/cm$^3$ or at least 2.5 g/cm$^3$.

Embodiment 15

The composition of any one of embodiments 1, 2, 3, and 4, wherein the abrasive particulate comprises a density of not greater than 4.5 g/cm$^3$, or not greater than 4.0 g/cm$^3$, or not greater than 3.5 g/cm3, or not greater than 3 g/cm$^3$, or not greater than 2.9 g/cm$^3$, or not greater than 2.8 g/cm$^3$, or not greater than 2.7 g/cm$^3$.

Embodiment 16

The composition of any one of embodiments 2 and 4, wherein the accelerant includes at least one compound which can form a free anion in the liquid, the free anion being selected from the group of iodide ($I^{1-}$), bromide ($Br^{1-}$), fluoride ($F^{1-}$), sulfate ($SO_4^{2-}$), sulfide ($S^{2-}$), sulfite ($SO_3^{2-}$), chloride ($Cl^{1-}$), silicate ($SiO_4^{4-}$), phosphate ($PO_4^{3-}$), nitrate ($NO_3^{1-}$), carbonate ($CO_3^{2-}$), perchlorate ($ClO_4^{1-}$) or any combination thereof.

Embodiment 17

The composition of any one of embodiments 1 and 16, wherein the accelerant includes iodide ($I^{1-}$).

Embodiment 18

The composition of any one of embodiments 1 and 16, wherein the accelerant includes bromide ($Br^{1-}$).

Embodiment 19

The composition of any one of embodiments 1 and 16, wherein the accelerant includes fluoride ($F^{1-}$).

Embodiment 20

The composition of any one of embodiments 1 and 16, wherein the accelerant includes sulfate ($SO_4^{2-}$).

Embodiment 21

The composition of any one of embodiments 1 and 16, wherein the accelerant includes sulfide ($S^{2-}$).

Embodiment 22

The composition of any one of embodiments 1 and 16, wherein the accelerant includes sulfite ($SO_3^{2-}$).

Embodiment 23

The composition of any one of embodiments 1 and 16, wherein the accelerant includes chloride ($Cl^{1-}$).

Embodiment 24

The composition of any one of embodiments 1 and 16, wherein the accelerant includes silicate ($SiO_4^{4-}$).

Embodiment 25

The composition of any one of embodiments 1 and 16, wherein the accelerant includes phosphate ($PO_4^{3-}$).

Embodiment 26

The composition of any one of embodiments 1 and 16, wherein the accelerant includes nitrate ($NO_3^{1-}$).

Embodiment 27

The composition of any one of embodiments 1 and 16, wherein the accelerant includes carbonate ($CO_3^{2-}$).

Embodiment 28

The composition of any one of embodiments 1 and 4, wherein the accelerant is present in a concentration of at least 0.002 M to not greater than 1.0 M.

Embodiment 29

The composition of any one of embodiments 2, 3, and 28, wherein the accelerant is present in a concentration of at least 0.003 M or at least 0.004 M or at least 0.005 M or at least 0.006 M or at least 0.007 M or at least 0.008 M or at least 0.009 M or at least 0.01 M or at least 0.02 M or at least 0.03 M or at least 0.04 M or at least 0.05 M or at least 0.06 M or at least 0.07 M or at least 0.08 M or at least 0.09 M or at least 0.1 M or at least 0.2 M or at least 0.3 M or at least 0.4 M or at least 0.5 M or at least 0.6 M or a least 0.7 M or at least 0.8 M or at least 0.9 M.

Embodiment 30

The composition of any one of embodiments 2, 3, and 28, wherein the accelerant is present in a concentration of not greater than 0.9 M or not greater than 0.8 M or not greater than 0.7 M or not greater than 0.6 M or not greater than 0.5 M or not greater than 0.4 M or not greater than 0.3 M or not greater than 0.2 M or not greater than 0.1 N or not greater than 0.09 M or not greater than 0.08 M or not greater than 0.07 M or not greater than 0.06 M or not greater than 0.05 M or not greater than 0.04 M or not greater than 0.03 M or not greater than 0.02 M or not greater than 0.01 M or not greater than 0.009 M or not greater than 0.008 M or not greater than 0.007 M or not greater than 0.006 M or not greater than 0.005 M or not greater than 0.004 M or not greater than 0.003 M.

Embodiment 31

The composition of any one of embodiments 1, 2, and 3, wherein the accelerant comprises a free anion formed from a compound having a solubility of greater than 10 g/L according to ASTM standard E1148 or at least 10.2 g/L or at least 10.5 g/L or at least 11 g/L or at least 12 g/L or at least 14 g/L or at least 16 g/L or at least 18 g/L or at least 20 g/L or at least 25 g/L or at least 30 g/L or at least 40 g/L or at least 50 g/L or at least 60 g/L or at least 70 g/L or at least 80 g/L or at least 90 g/L or at least 100 g/L or at least 200 g/L or at least 300 g/L or at least 400 g/L or at least 500 g/L or at least 600 g/L or at least 700 g/L or at least 800 g/L or at least 900 g/L or at least 1000 g/L.

Embodiment 32

The composition of any one of embodiments 2, 3, and 30, wherein the accelerant comprises a free anion formed from a compound having a solubility of not greater than 10,000 g/L, or not greater than 9000 g/L or not greater than 8000 g/L or not greater than 7000 g/L or not greater than 6000 g/L or not greater than 5000 g/L or not greater than 4000 g/L or not greater than 3000 g/L or not greater than 2000 g/L or not greater than 1000 g/L or not greater than 900 g/L or not greater than 800 g/L or not greater than 700 g/L or not greater than 600 g/L or not greater than 500 g/L or not greater than 400 g/L or not greater than 300 g/L or not greater than 200 g/L or not greater than 100 g/L or not greater than 90 g/L or not greater than 80 g/L or not greater than 70 g/L or not greater than 60 g/L or not greater than 50 g/L.

Embodiment 33

The composition of any one of embodiments 1, 2, 3, and 4, wherein the accelerant comprises at least one free cation including an element or compound including at least one species selected from the group consisting of Group 1 elements, Group 2 elements, Group 3 elements, Group 4 elements, Group 5 elements, Group 6 elements, Group 7 elements, Group 8 elements, Group 9 elements, Group 10 elements, Group 11 elements, Group 12 elements, Group 13 elements, Group 14 elements, or any combination thereof.

Embodiment 34

The composition of any one of embodiments 1, 2, 3, and 4, wherein the accelerant comprises at least one free cation contained within the carrier, the cation being selected from the group of $H^+$, $Li^+$, $Na^+$, $K^+$, $Cs^+$, $Be^{2+}$, $Mg^{2+}$, $Ca^{2+}$, $Sr^{2+}$, $Ba^{2+}$, $NH_4^+$, $Ag^+$, $Mn^{2+}$, $Fe^{2+}$, $Fe^3$, $Co^{2+}$, $Co^{3+}$, $Ni^{2+}$, $Ni^{3+}$, $Cu^{2+}$, $Pb^{2+,}$ $Hg^+$, $Hg^{2+}$, $Al^{3+}$, $Cr^{2+}$, $Cr^+$, $Cr^{4+}$, $Cr^{6+}$, or any combination thereof.

Embodiment 35

The composition of embodiments 33 or 34, wherein the free cation contained within the carrier is present in a concentration within a range of at least 0.002 M and not greater than 1.0 M.

Embodiment 36

The composition of any one of embodiments 1, 2, 3, and 4, wherein the accelerant includes a compound selected from KF, NaF, RbF, $NiF_2$, $ZnF_2$, $CoF_2$, or any combination thereof.

Embodiment 37

The composition of any one of embodiments 2 and 4, wherein the buffer includes a compound selected from the group of $M_aF_x$, $N_bF_x$, $M_aN_bF_x$, $M_aI_x$, $N_bI_x$, $M_aN_bI_x$, $M_aBr_x$, $N_bBr_x$, $M_aN_bBr_x$, $M_a(SO_4)_x$, $N_b(SO_4)_x$, $M_aN_b(SO_4)_x$, $M_aS_x$, $N_bS_x$, $M_aN_bS_x$, $M_a(SiO_4)_x$, $N_b(SiO_4)_x$, $M_aN_b(SiO_4)_x$, $M_a(PO_4)_x$, $N_b(PO_4)_x$, $M_aN_b(PO_4)_x$, $M_a(NO_3)_x$, $N_b(NO_3)_x$, $M_aN_b(NO_3)_x$, $M_a(CO_3)_x$, $N_b(CO_3)_x$, $M_aN_b(CO_3)_x$, or any combination thereof, wherein M represents a metal element or metal compound; N represents a non-metal element; and a, b, and x is 1-6, and wherein the buffer is different than the accelerant.

Embodiment 38

The composition of any of embodiments 1, 2, 3, and 4, wherein the accelerant and the buffer contain a same type of anion.

Embodiment 39

The composition of any of embodiments 1, 2, 3, and 4, wherein the accelerant and the buffer contain fluoride ($F^-$) or a fluoride comprising anion.

Embodiment 40

The composition of any one of embodiments 1, 3, and 37, wherein M represents at least one metal element selected from the group consisting of Group 1 elements, Group 2 elements, transition metal elements, rare earth elements, or any combination thereof.

Embodiment 41

The composition of any one of embodiments 1, 3, and 37, wherein M represents at least one metal element or metal compound selected from the group consisting of Li, Na, K, Cs, Be, Mg, Ca, Sr, Ba, Ag, Mn, Co, Ni, Cu, Pb, Hg, Al, Cr, Fe, or any combination thereof.

Embodiment 42

The composition of any one of embodiments 1, 3, and 37, wherein N represents at least one non-metal element or compound selected from the group consisting of Group 13 elements, Group 14 elements, Group 15 elements, or any combination thereof.

Embodiment 43

The composition of any one of embodiments 1, 3, and 37, wherein N represents at least one non-metal element selected from the group of H, B, C, Si, Ge, N, P, or any combination thereof.

Embodiment 44

The composition of any one of embodiments 1, 2, 3, and 4, wherein the buffer comprises a compound selected from $KBF_4$, $NaBF_4$, $NH_4BF_4$, $KPF_6$, $NaPF_6$, $CaF_2$, $MgF2$, $Na_3AlF_6$, $FeF_3$, $LiF$, $MnF_2$, $AlF_3$, or any combination thereof.

Embodiment 45

The composition of embodiment 44, wherein the buffer comprises a compound selected from $KBF_4$, $NaBF_4$, $NH_4BF_4$, $KPF_6$, $NaPF_6$, or any combination thereof.

Embodiment 46

The composition of embodiment 45, wherein the buffer comprises $KBF_4$.

Embodiment 47

The composition of any of embodiments 1, 2, 3, and 4, wherein the accelerant includes KF and the buffer includes $KBF_4$.

Embodiment 48

The composition of any of embodiments 1, 2, 3, and 4, consisting essentially of silica particles, water, KF, and $KBF_4$.

Embodiment 49

The composition of embodiment 1, wherein the buffer comprises a solubility of less than 10 g/L according to ASTM standard E1148.

Embodiment 50

The composition of any one of embodiments 2, 3, 4, and 49, wherein the buffer comprises a solubility of not greater than 9.8 g/L according to ASTM standard E1148. or not greater than 9.5 g/L, or not greater than 9.2 g/L or not greater than 9 g/L or not greater than 8.5 g/L or not greater than 8 g/L or not greater than 7.5 g/L or not greater than 7 g/L or not greater than 6.5 g/L or not greater than 6 g/L or not greater than 5.5 g/L or not greater than 5 g/L or not greater than 4.5 g/L or not greater than 4 g/L or not greater than 3.5 g/L or not greater than 3 g/L or not greater than 2.5 g/L or not greater than 2 g/L or not greater than 1.5 g/L or not greater than 1 g/L or not greater than 0.5 g/L or not greater than 0.1 g/L or not greater than 0.05 g/L.

Embodiment 51

The composition of any one of embodiments 2, 3, 4, and 49, wherein the buffer comprises a solubility of at least 0.001 g/L or at least 0.005 g/L or at least 0.01 g/L or at least 0.05 g/L or at least 0.1 g/L or at least 0.5 g/L or at least 1 g/L or at least 1.5 g/L or at least 2 g/L or at least 2.5 g/L or at least 3 g/L or at least 3.5 g/L or at least 4 g/L or at least 4.5 g/L or at least 5 g/L or at least 5.5 g/L or at least 6 g/L or at least 6.5 g/L or at least 7 g/L or at least 7.5 g/L or at least 8 g/L or at least 8.5 g/L or at least 9 g/L.

Embodiment 52

The composition of any one of embodiments 1, 2, 3, and 4, wherein the buffer is present in an amount within a range of at least 0.01 wt % and not greater than 10 wt %.

Embodiment 53

The composition of any one of embodiments 1, 2, 3, and 4, wherein the solubility of the buffer is less than the solubility of the accelerant compound from which the accelerant is produced.

Embodiment 54

The composition of any one of embodiments 1, 2, 3, and 4, further comprising a pH of at least 8 or at least 9 or at least 10 or at least 11.

Embodiment 55

The composition of any one of embodiments 1, 2, 3, and 4, further comprising a pH of not greater than 12 or not greater than 11 or not greater than 10 or not greater than 9.

Embodiment 56

The composition of any one of embodiments 1, 2, 3, and 4, further comprising a pH of at least 8 and not greater than 12.

Embodiment 57

The composition of any one of embodiments 1, 2, 3, and 4, further comprising at least one additive selected from the group consisting of oxidizers, dispersants, surfactants, lubricants, or any combination thereof.

Embodiment 58

The composition of any one of embodiments 1, 2, 3, and 4, wherein the composition is free of at least one of an oxidizer, dispersant, surfactant, lubricant or any combination thereof.

Embodiment 59

The composition of any one of embodiments 1, 2, 3, and 4, wherein the composition is free of organic compounds including polymers.

Embodiment 60

The composition of any one of embodiments 1, 2, 3, and 4, further comprising an average material removal rate of at least 8.0 microns/hr according to a Zirconia Polishing Test.

Embodiment 61

The composition of embodiment 60, further comprising a surface roughness factor of less than 20 Angstroms.

Embodiment 62

A composition comprising:
an abrasive particulate;
an accelerant compound comprising a solubility of at least 10 g/L according to ASTM standard E1148;
a buffer having a solubility of less than 10 g/L according to ASTM standard E1148; and a solubility ratio ($S_A/S_B$) of at least 1.02, wherein $S_A$ represents the solubility of the accelerant and $S_B$ represents the solubility of the buffer.

Embodiment 63

A composition comprising:
an abrasive particulate;
an accelerant compound including at least one anion selected from the group of iodide ($I^{1-}$), bromide ($Br^{1-}$), fluoride ($F^{1-}$), sulfate ($SO_4^{2-}$), sulfide ($S^{2-}$), sulfite ($SO_3^{2-}$), chloride ($Cl^{1-}$), silicate ($SiO_4^{4-}$), phosphate ($PO_4^{3-}$), nitrate ($NO_3^{1-}$), carbonate ($CO_3^{2-}$), or perchlorate ($ClO_4^{1-}$); and
a buffer including a compound selected from the group of $M_aF_x$, $N_bF_x$, $M_aN_bF_x$, $M_aI_x$, $N_bI_x$, $M_aN_bI_x$, $M_aBr_x$, $N_bBr_x$, $M_aN_bBr_x$, $M_a(SO_4)_x$, $N_b(SO_4)_x$, $M_aN_b(SO_4)_x$, $M_aS_x$, $N_bS_x$, $M_aN_bS_x$, $M_a(SiO_4)_x$, $N_b(SiO_4)_x$, $M_aN_b(SiO_4)_x$, $M_a(PO_4)_x$, $N_b(PO_4)_x$, $M_aN_b(PO_4)_x$, $M_a(NO_3)_x$, $N_b(NO_3)_x$, $M_aN_b(NO_3)_x$, $M_a(CO_3)_x$, $N_b(CO_3)_x$, $M_aN_b(CO_3)_x$, or any combination thereof, wherein M represents a metal element or metal compound; N represents a non-metal element; and a, b, and x is 1-6, and wherein the buffer is different than the accelerant.

Embodiment 64

The composition of any one of embodiments 62 and 63, wherein the abrasive particulate comprises an average particle size (D50) of not greater than 20 microns and at least 10 nm.

Embodiment 65

The composition of any one of embodiments 62 and 63, wherein the abrasive particulate comprises D90-D10 range of at least 5 nm to not greater than 20 microns.

Embodiment 66

The composition of any one of embodiments 62 and 63, wherein the abrasive particulate comprises at least one of fused silica, colloidal silica, quartz, fumed silica, silica fumes, or any combination thereof.

Embodiment 67

The composition of any one of embodiments 62 and 63, wherein the abrasive particulate includes a majority content of silica, wherein the abrasive particulate consists essentially of silica.

Embodiment 68

The composition of any one of embodiments 62 and 63, wherein the abrasive particulate includes less than 1 wt % of alumina, zirconia, silicon carbide, diamond, cubic boron nitride, boron carbide, ceria, titania, yttria, rare earth elements, aluminosilicate, transition metal elements, or any combination thereof.

Embodiment 69

The composition of any one of embodiments 62 and 63, wherein the abrasive particulate comprises a density of at least 90% theoretical density or at least 95% theoretical density or at least 98% theoretical density or at least 99% theoretical density.

Embodiment 70

The composition of any one of embodiments 62 and 63, wherein the abrasive particulate comprises a density of at least 2.3 g/cm$^3$ or at least 2.4 g/cm$^3$ or at least 2.5 g/cm$^3$.

Embodiment 71

The composition of any one of embodiments 62 and 63, wherein the abrasive particulate comprises a density of not greater than 4.5 g/cm$^3$, or not greater than 4.0 g/cm$^3$, or not greater than 3.5 g/cm$^3$ or 3 g/cm$^3$ or not greater than 2.9 g/cm$^3$ or not greater than 2.8 g/cm$^3$ or not greater than 2.7 g/cm$^3$.

Embodiment 72

The composition of embodiment 62, wherein the accelerant compound includes at least one anion selected from the group of iodide ($I^{1-}$), bromide ($Br^{1-}$), fluoride ($F^{1-}$), sulfate ($SO_4^{2-}$), sulfide ($S^{2-}$), sulfite ($SO_3^{2-}$), chloride ($Cl^{1-}$), silicate ($SiO_4^{4-}$), phosphate ($PO_4^{3-}$), nitrate ($NO_3^{1-}$), carbonate ($CO_3^{2-}$), perchlorate ($ClO_4^{1-}$) or any combination thereof.

Embodiment 73

The composition of any one of embodiments 63 and 72, wherein the accelerant compound includes iodide ($I^{1-}$).

Embodiment 74

The composition of any one of embodiments 63 and 72, wherein the accelerant compound includes bromide ($Br^{1-}$).

Embodiment 75

The composition of any one of embodiments 63 and 72, wherein the accelerant compound includes fluoride ($F^{1-}$).

Embodiment 76

The composition of any one of embodiments 63 and 72, wherein the accelerant compound includes sulfate ($SO_4^{2-}$).

Embodiment 77

The composition of any one of embodiments 63 and 72, wherein the accelerant compound includes sulfide ($S^{2-}$).

Embodiment 78

The composition of any one of embodiments 63 and 72, wherein the accelerant compound includes sulfite ($SO_3^{2-}$).

Embodiment 79

The composition of any one of embodiments 63 and 72, wherein the accelerant compound includes chloride ($Cl^{1-}$).

Embodiment 80

The composition of any one of embodiments 63 and 72, wherein the accelerant compound includes silicate ($SiO_4^{4-}$).

Embodiment 81

The composition of any one of embodiments 63 and 72, wherein the accelerant compound includes phosphate ($PO_4^{3-}$).

Embodiment 82

The composition of any one of embodiments 63 and 72, wherein the accelerant compound includes nitrate ($NO_3^{1-}$).

Embodiment 83

The composition of any one of embodiments 63 and 72, wherein the accelerant compound includes carbonate ($CO_3^{2-}$).

Embodiment 84

The composition of any one of embodiments 63 and 72, wherein the accelerant compound includes perchlorate ($ClO_4^{1-}$).

Embodiment 85

The composition of any one of embodiments 63 and 72, wherein the accelerant compound is present in an amount of at least 0.15 wt % to not greater than 15 wt % for a total weight of the composition.

Embodiment 86

The composition of any one of embodiments 62 and 63, wherein the accelerant compound comprises a solubility of greater than 10 g/L according to ASTM standard E1148 or at least 10.2 g/L or at least 10.5 g/L or at least 11 g/L or at least 12 g/L or at least 14 g/L or at least 16 g/L or at least 18 g/L or at least 20 g/L or at least 25 g/L or at least 30 g/L or at least 40 g/L or at least 50 g/L or at least 60 g/L or at least 70 g/L or at least 80 g/L or at least 90 g/L or at least 100 g/L or at least 200 g/L or at least 300 g/L or at least 400 g/L or at least 500 g/L or at least 600 g/L or at least 700 g/L or at least 800 g/L or at least 900 g/L or at least 1000 g/L.

Embodiment 87

The composition of any one of embodiments 62 and 63, wherein the accelerant compound comprises a solubility of not greater than 10,000 g/L, or not greater than 9000 g/L or not greater than 8000 g/L or not greater than 7000 g/L or not greater than 6000 g/L or not greater than 5000 g/L or not greater than 4000 g/L or not greater than 3000 g/L or not greater than 2000 g/L or not greater than 1000 g/L or not greater than 900 g/L or not greater than 800 g/L or not greater than 700 g/L or not greater than 600 g/L or not greater than 500 g/L or not greater than 400 g/L or not greater than 300 g/L or not greater than 200 g/L or not greater than 100 g/L or not greater than 90 g/L or not greater than 80 g/L or not greater than 70 g/L or not greater than 60 g/L or not greater than 50 g/L.

Embodiment 88

The composition of any one of embodiments 62 and 63, wherein the accelerant compound includes at least one species selected from the group consisting of Group 1 elements, Group 2 elements, Group 3 elements, Group 4 elements, Group 5 elements, Group 6 elements, Group 7 elements, Group 8 elements, Group 9 elements, Group 10 elements, Group 11 elements, Group 12 elements, Group 13 elements, Group 14 elements, or any combination thereof.

Embodiment 89

The composition of any one of embodiments 62 and 63, wherein the accelerant compound comprises the cation selected from $H^+$, $Li^+$, $Na^+$, $K^+$, $Cs^+$, $Be^{2+}$, $Mg^{2+}$, $Ca^{2+}$, $Sr^{2+}$, $Ba^{2+}$, $NH_4^+$, $Ag^+$, $Mn^{2+}$, $Fe^{2+}$, $Fe^{3+}$, $Co^{2+}$, $Co^{3+}$, $Ni^{2+}$, $Ni^{3+}$, $Cu^{2+}$, $Pb^{2+}$, $Hg^+$, $Hg^{2+}$, $Al^{3+}$, $Cr^{2+}$, $Cr^{3+}$, $Cr^{4+}$, $Cr^{6+}$, or any combination thereof.

Embodiment 90

The composition of any one of embodiments 62 and 63, wherein the accelerant compound includes $KF$, $NaF$, $RbF$, $NiF_2$, $ZnF_2$, $CoF_2$, or any combination thereof.

Embodiment 91

The composition of embodiment 62, wherein the buffer includes a compound selected from the group of $M_aF_x$, $N_bF_x$, $M_aN_bF_x$, $M_aI_x$, $N_bI_x$, $M_aN_bI_x$, $M_aBr_x$, $N_bBr_x$, $M_aN_bBr_x$, $M_a(SO_4)_x$, $N_b(SO_4)_x$, $M_aN_b(SO_4)_x$, $M_aS_x$, $N_bS_x$, $M_aN_bS_x$, $M_a(SiO_4)_x$, $N_b(SiO_4)_x$, $M_aN_b(SiO_4)_x$, $M_a(PO_4)_x$, $N_b(PO_4)_x$, $M_aN_b(PO_4)_x$, $M_a(NO_3)_x$, $N_b(NO_3)_x$, $M_aN_b(NO_3)_x$, $M_a(CO_3)_x$, $N_b(CO_3)_x$, $M_aN_b(CO_3)_x$, or any combination thereof, wherein M represents a metal element or metal compound; N represents a non-metal element; and a, b, and x is 1-6, and wherein the buffer is different than the accelerant compound.

Embodiment 92

The composition of any one of embodiments 63 and 91, wherein M represents at least one metal element or compound selected from the group consisting of Group 1 elements, Group 2 elements, transition metal elements, rare earth elements, or any combination thereof.

Embodiment 93

The composition of any one of embodiments 63 and 91, wherein M represents at least one metal element selected from the group consisting of Li, Na, K, Cs, Be, Mg, Ca, Sr, Ba, Ag, Mn, Co, Ni, Cu, Pb, Hg, Al, Cr, Fe, or any combination thereof.

Embodiment 94

The composition of any one of embodiments 63 and 91, wherein N represents at least one non-metal element selected from a Group 12 element, a Group 13 element, a Group 14 element, a Group 15 element, or any combination thereof.

Embodiment 95

The composition of any one of embodiments 63 and 91, wherein N represents at least one non-metal element selected from H, B, C, Si, N, P or any combination thereof.

Embodiment 96

The composition of any one of embodiments 63 and 91, wherein the buffer includes $KBF_4$, $NaBF_4$, $NH_4BF_4$, $KPF_6$, $NaPF_6$, $CaF_2$, $MgF_2$, $Na_3AlF_6$, $FeF_3$, LiF, $MnF_2$, $AlF_3$, or any combination thereof.

Embodiment 97

The composition of embodiment 96, wherein the buffer comprises a compound selected from the group of $KBF_4$, $NaBF_4$, $NH_4BF_4$, $KPF_6$, $NaPF_6$.

Embodiment 98

The composition of embodiment 97, wherein the buffer comprises $KBF_4$.

Embodiment 99

The composition of any of embodiments 62 to 98, wherein the accelerant includes KF and the buffer includes $KBF_4$.

Embodiment 100

The composition of any of embodiments 62 to 99, consisting essentially of silica, KF and $KBF_4$.

Embodiment 101

The composition of embodiment 63, wherein the buffer comprises a solubility of less than 10 g/L according to ASTM standard E1148.

Embodiment 102

The composition of any one of embodiments 62 and 101, wherein the buffer comprises a solubility of not greater than 9.8 g/L according to ASTM standard E1148 or not greater than 9.5 g/L, or not greater than 9.2 g/L or not greater than 9 g/L or not greater than 8.5 g/L or not greater than 8 g/L or not greater than 7.5 g/L or not greater than 7 g/L or not greater than 6.5 g/L or not greater than 6 g/L or not greater than 5.5 g/L or not greater than 5 g/L or not greater than 4.5 g/L or not greater than 4 g/L or not greater than 3.5 g/L or not greater than 3 g/L or not greater than 2.5 g/L or not greater than 2 g/L or not greater than 1.5 g/L or not greater than 1 g/L or not greater than 0.5 g/L or not greater than 0.1 g/L or not greater than 0.05 g/L.

Embodiment 103

The composition of any one of embodiments 62 and 101, wherein the buffer comprises a solubility of at least 0.001 g/L or at least 0.005 g/L or at least 0.01 g/L or at least 0.05 g/L or at least 0.1 g/L or at least 0.5 g/L or at least 1 g/L or at least 1.5 g/L or at least 2 g/L or at least 2.5 g/L or at least 3 g/L or at least 3.5 g/L or at least 4 g/L or at least 4.5 g/L or at least 5 g/L or at least 5.5 g/L or at least 6 g/L or at least 6.5 g/L or at least 7 g/L or at least 7.5 g/L or at least 8 g/L or at least 8.5 g/L or at least 9 g/L.

Embodiment 104

The composition of any one of embodiments 62 and 63, wherein the buffer is present in an amount within a range of at least 0.15 wt % and not greater than 30 wt %.

Embodiment 105

The composition of any one of embodiments 62 and 63, wherein the buffer includes a compound including an anion species that is the same as an anion species contained in the accelerant compound.

Embodiment 106

The composition of any one of embodiments 62 and 63, wherein the buffer includes a compound including an anion species that is different from an anion species contained in the accelerant compound.

Embodiment 107

The composition of any one of embodiments 62 and 63, wherein the solubility of the buffer is less than the solubility of the accelerant compound from which the accelerant is produced.

Embodiment 108

The composition of any one of embodiments 62 and 63, further comprising at least one additive selected from the

27 group consisting of oxidizers, dispersants, surfactants, lubricants, or any combination thereof.

Embodiment 109

The composition of any one of embodiments 62 and 63, wherein the composition is free of at least one of an oxidizer, dispersant, surfactant, lubricant, or any combination thereof.

Embodiment 110

The composition of any one of embodiments 62 and 63, wherein the composition is free of organic materials including polymers.

Embodiment 111

A composition comprising:
a carrier including a liquid;
an abrasive particulate contained in the carrier;
an accelerant contained in the carrier in a saturated concentration, the accelerant including at least one anion selected from the group consisting of iodide ($I^{1-}$), bromide ($Br^{1-}$), fluoride ($F^{1-}$), sulfate ($SO_4^{2-}$), sulfide ($S^{2-}$), sulfite ($SO_3^{2-}$), chloride ($Cl^{1-}$), silicate ($SiO_4^{4-}$), phosphate ($PO_4^{3-}$), nitrate ($NO_3^{1-}$), carbonate ($CO_3^{2-}$), perchlorate ($ClO_4^{1-}$) or any combination thereof; and
a chelating agent including at least one composition selected from the group consisting of a dihydroxybenzene disulfonic acid, 2-hydroxy ethyl glycine, ethylenediaminetetraacetic acid, deferoxamine, diethylenetriaminepentaacetic acid, etidronic acid, disodium-4,5-dihydroxy-1,3-benzenedisulfonate, nitrilotriacetic acid, or any combination thereof.

Embodiment 112

A polishing slurry configured to polish zirconia-containing materials, the polishing slurry comprising:
a carrier comprising a liquid;
an abrasive particulate contained in the carrier;
an average material removal rate of at least 8.0 microns/hr and a surface roughness (Ra) factor of not greater than 20 Angstroms according to a Zirconia Polishing Test.

Embodiment 113

The polishing slurry of embodiment 112, further comprising an accelerant contained in the carrier, the accelerant including at least one anion selected from the group consisting of iodide ($I^{1-}$), bromide ($Br^{1-}$), fluoride ($F^{1-}$), sulfate ($SO_4^{2-}$), sulfide ($S^{2-}$), sulfite ($SO_3^{2-}$), chloride ($Cl^{1-}$), silicate ($SiO_4^{4-}$), phosphate ($PO_4^{3-}$), nitrate ($NO_3^{1-}$), carbonate ($CO_3^{2-}$), perchlorate ($ClO_4^{1-}$), or any combination thereof.

Embodiment 114

The polishing slurry of embodiment 112, further comprising a buffer contained in the carrier, the buffer including a compound selected from the group consisting of a buffer contained in the carrier, the buffer including a compound selected from the group of $M_aF_x$, $N_bF_x$, $M_aN_bF_x$, $M_aI_x$, $N_bI_x$, $M_aN_bI_x$, $M_aBr_x$, $N_bBr_x$, $M_aN_bBr_x$, $M_a(SO_4)_x$, $N_b(SO_4)_x$, $M_aN_b(SO_4)_x$, $M_aS_x$, $N_bS_x$, $M_aN_bS_x$, $M_a(SiO_4)_x$, $N_b(SiO_4)_x$, $M_aN_b(SiO_4)_x$, $M_a(PO_4)_x$, $N_b(PO_4)_x$, $M_aN_b(PO_4)_x$, $M_a(NO_3)_x$, $N_b(NO_3)_x$, $M_aN_b(NO_3)_x$, $M_a(CO_3)_x$, $N_b(CO_3)_x$, $M_aN_b(CO_3)_x$, or any combination thereof, wherein M represents a metal element or metal compound; N represents a non-metal element; and a, b, and x is 1-6, and wherein the buffer is different than the accelerant.

Embodiment 115

The polishing slurry of embodiment 112, further comprising an accelerant contained in the carrier, the accelerant comprising an anion present in a concentration of 0.002 M to 1.0 M.

Embodiment 116

The polishing slurry of embodiment 112, further comprising a buffer contained in the carrier, wherein the buffer has a solubility of less than 10 g/L according to ASTM standard E1148.

Embodiment 117

The polishing slurry of embodiment 112, further comprising: an accelerant contained in the carrier, the accelerant comprising fluoride ($F^{1-}$) present in an amount within a range of at least 0.002 M and not greater than 1.0 M; and a buffer contained in the carrier, the buffer comprising MANBFX, wherein the buffer has a solubility less than 10 g/L.

Embodiment 118

The polishing slurry of embodiment 112, further comprising: an accelerant contained in the carrier, the accelerant comprising an anion formed from a compound having a solubility of greater than 10 g/L according to ASTM standard E1148; and a buffer contained in the carrier, the buffer having a solubility of less than 10 g/L according to ASTM standard E1148.

EXAMPLES

Example 1

A first polishing slurry composition (Sample S1) was formed and included 25 wt % of colloidal silica having a D50 of 100 nm and a D90-D10 range value of 109 nm. The slurry composition further included 75 wt % of water. The slurry composition included no optional additives. The pH of the slurry composition was adjusted to approximately 10.5 by the addition of KOH.

A second polishing slurry composition was formed (Sample S2). A dry powder composition was first formed and included 98.06 wt % of colloidal silica abrasive particulate having a D50 of 100 nm and a D90-D10 range value of 109 nm and 1.94 wt % of potassium fluoride (KF) as an accelerant compound. After forming the dry powder composition, the dry powder composition was combined with deionized water as a liquid carrier to form a slurry composition. The slurry composition included 24.88 wt % of silica abrasive particulate and 0.49 wt % KF. The slurry composition included no optional additives. The pH of the slurry composition was adjusted to approximately 10.5 by the addition of KOH.

A third polishing composition was formed (Sample S3). A dry powder composition was first formed and included 93.95 wt % of the colloidal silica used in samples S1 and S2, and 4.04 wt % of $KBF_4$. After forming the dry powder composition, the dry powder composition was combined with deionized water as a liquid carrier to form a slurry composition. The slurry composition included 24.65 wt % of silica abrasive particulate and 1.06 wt % $KBF_4$, and no further additives. The pH of the slurry composition was adjusted to approximately 10.5 by the addition of KOH.

A fourth polishing slurry composition was formed (Sample S4) by first forming a dry powder composition including 94.11 wt % of colloidal silica abrasive particulate of the same type used in Samples 51, S2, and S3, 1.86 wt % of potassium fluoride (KF) as an accelerant compound, and 4.04 wt % of $KBF_4$ as a buffer. After forming the dry powder composition, the dry powder composition was combined with deionized water as a liquid carrier to form a slurry composition. The slurry composition included 24.61 wt % of silica, 1.06 wt % buffer ($KBF_4$), and 0.49 wt % KF. The slurry composition included no optional additives. The pH of the slurry composition was adjusted to approximately 10.5 by the addition of KOH.

The slurry compositions of Samples 51, S2, S3, and S4 were compared by conducting a Zirconia Polishing Test on zirconia wafers (see description below). The test results are presented in Table 1 and FIG. 1. It can be seen that the slurry composition S4 including KF and $KBF_4$ had a significantly improved material removal rate (MMR) in comparison to Samples 51, S2, and S3. Adding KF alone (S2) did not cause an increase of the MRR and adding KBF4 alone (S3) improved the MRR only to a minor extent in comparison to having no additive in the silica slurry (S1). The MMR increase of sample S4 in comparison to the slurry composition 51 containing water and silica was 43%.

TABLE 1

| Sample | Silica [wt %] | KF [wt %] | $KBF_4$ [wt %] | MRR [μm/hour] | Surface Roughness [Å] |
|---|---|---|---|---|---|
| S1 | 25.10 | — | — | 7.7 | 11.3 |
| S2 | 24.88 | 0.49 | — | 7.6 | 11.9 |
| S3 | 24.65 | — | 1.06 | 9.0 | — |
| S4 | 24.61 | 0.49 | 1.06 | 11.00 | 9.9 |

Sample S4 further obtained the lowest surface roughness of the polished zirconia wafers with 9.9 Å, in comparison to 11.3 Å (sample S1) and 11.9 Å (sample S2), see also Table 1.

Example 2

Slurry compositions S5 and S6 were prepared according to the same procedure and compositions as in Example 1, except that the used colloidal silica abrasive particulate had a D50 size of 74.5 nm and a D90-D10 range value of 25 nm. Slurry composition S5 contained in addition to water silica only, and sample S6 contained water, silica, KF, and KBF4.

The slurry compositions S5 and S6 were compared by conducting the Zirconia Polishing Test of Example 1. The results are illustrated in Table 2. It can be seen that Sample S6, including the combination of silica, KF and KBF4, demonstrated significantly improved material removal rate in comparison to Samples S5 (silica only). The material removal rate increase of sample S6 in comparison to the slurry composition containing water and silica only (S5) was 59%.

Example 3

Slurry compositions S7 and S8 were prepared according to the same procedure and compositions as in Example 1 for samples Si to S4, except that the used colloidal silica abrasive particulate had a D50 size of 79.6 nm and a D90-D10 range value of 0.03 nm.

Slurry composition S7 contained water and silica only, and sample S8 contained water, silica, KF, and KBF4.

The slurry compositions S7 and S8 were compared by conducting the Zirconia Polishing Test of Example 1. The results are summarized in Table 2. It can be seen that Sample S8, including the combination of silica, KF and KBF4, demonstrated significantly improved material removal rate in comparison to Samples S7 (silica only). The material removal rate increase of sample S8 in comparison to the slurry composition containing water and silica only (S7) was 33%.

TABLE 2

| | MRR[μm/hour] Silica only | MRR[μm/hour] Silica + KF + KBF4 | MRR Increase [%] |
|---|---|---|---|
| Example 1 | 7.7 (S1) | 11.0 (S4) | 43 |
| Example 2 | 5.1 (S5) | 8.1 (S6) | 59 |
| Example 3 | 7.5 (S7) | 10.0 (S8) | 33 |

Zirconia polishing test for measuring the material removal rate of the polishing slurries.

The Zirconia Polishing Test was conducted on 2-inch diameter polycrystalline yttria-stabilized ZrO2 wafers. Eight wafers having a starting average surface roughness of approximately 250-750 Å were placed into a template on a 36" Speedfam GPAW polisher. Polishing was conducted on the wafers using a new Eminess Suba 600 XY-grooved polishing pad. The wafers were processed at 60 RPM platen rotation speed with a downward polishing pressure of 5.0 psi. The slurry flow rate was set at 55 mL/minute and added to the center of the polishing pad for 5 seconds before beginning the polishing process. The drain from the polisher trough was set-up to recirculate the slurry such that slurry draining from the trough is returned to the vessel from which slurry is pumped to the pad. Slurry in the vessel was continuously agitated with an axial-flow turbine impeller. The total slurry volume was 2 gallons. The wafers were processed in three, 60-minute intervals for a total of 180 minutes of processing time. The pad temperature during the polishing process was maintained between 22-25° C. After processing, the wafers were cleaned using Kimwipes and tap water and then dried using compressed air.

The material removal rate (MRR) is determined by the change in mass of the wafer before and after polishing. The change in mass of the wafer before and after is divided by the time spent polishing (i.e., 60 minutes) to calculate the average material removal rate. The mass of the wafers are measured using a benchtop scale. The surface roughness of the wafers is determined using a Zygo NewView 3D optical surface profiler and Zygo Mx software. The instrument maps a 0.17×0.17 mm region of the wafer for each surface roughness measurement. Five measurements are taken per wafer. The measurements for all eight of the wafers are averaged to calculate the average surface roughness factor (Ra) for a slurry composition.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The Abstract of the Disclosure is provided to comply with Patent Law and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all features of any of the disclosed embodiments. Thus, the following claims are incorporated into the Detailed Description, with each claim standing on its own as defining separately claimed subject matter.

What is claimed is:

1. A composition comprising:
a carrier comprising a liquid;
an abrasive particulate contained in the carrier;
an accelerant contained in the carrier, the accelerant being fully dissolved and including free fluoride (F$^-$) anions; and
a buffer contained in a saturated concentration in the carrier, the buffer including a compound selected from $M_aF_x$, $N_bF_x$, $M_aN_bF_x$, or any combination thereof, wherein M represents a metal element or metal compound; N represents a non-metal element; and a, b, and x is 1-6, and wherein the buffer is different than the accelerant,
wherein the accelerant has a solubility of at least 50 g/L and the buffer has a solubility of less than 10 g/L according to ASTM standard E1148.

2. The composition of claim 1, wherein the carrier comprises water.

3. The composition of claim 1, wherein the carrier is present in an amount of at least 45 wt % for a total weight of the composition.

4. The composition of claim 1, wherein the abrasive particulate comprises a density of not greater than 4.5 g/cm$^3$.

5. The composition of claim 1, wherein the abrasive particulate comprises silica.

6. The composition of claim 1, wherein the accelerant includes a compound selected from KF, NaF, RbF, NiF$_2$, ZnF$_2$, CoF$_2$, or any combination thereof.

7. The composition claim 1, wherein the buffer includes a compound selected from KBF$_4$, NaBF$_4$, NH$_4$BF$_4$, KPF$_6$, NaPF$_6$, CaF$_2$, MgF2, Na$_3$AlF$_6$, FeF$_3$, LiF, MnF$_2$, AlF$_3$, or any combination thereof.

8. The composition of claim 1, wherein the accelerant is present in a concentration of at least 0.002 M to not greater than 1.0 M.

9. The composition of claim 1, wherein the accelerant includes KF and the buffer includes KBF$_4$.

10. The composition of claim 1, wherein the abrasive particulate comprises silica, the accelerant comprises KF, and the buffer comprises KBF$_4$.

11. The polishing slurry of claim 1, wherein the polishing slurry is adapted to polish a zirconia-containing material with an average material removal rate (MMR) of at least 8.0 microns/hour according to a Zirconia Polishing Test.

12. The composition of claim 1, wherein a pH of the composition is at least 9.

13. A composition comprising:
a carrier comprising a liquid;
an abrasive particulate contained in the carrier, wherein the abrasive particulate comprises silica;
an accelerant contained in the carrier, the accelerant being fully dissolved and comprising free fluoride ions (F$^{1-}$) present in an amount within a range of at least 0.002 M and not greater than 1.0 M and the accelerant has a solubility of at least 50 g/L;
a buffer contained in the carrier, the buffer comprising $M_aN_bF_x$, wherein M is a metal element, N is a non-metal element, and a, b, x are 1-6, and wherein the buffer has a solubility less than 10 g/L,
wherein the buffer is contained in a saturated concentration in the carrier.

14. The composition of claim 13, wherein the buffer includes KBF$_4$.

15. The composition of claim 13, wherein the accelerant includes a compound selected from KF, NaF, RbF, NiF$_2$, ZnF$_2$, CoF$_2$, or any combination thereof.

16. The composition claim 13, wherein the buffer includes a compound selected from KBF$_4$, NaBF$_4$, NH$_4$BF$_4$, KPF$_6$, NaPF$_6$, or any combination thereof.

17. The composition of claim 13, wherein the accelerant comprises KF and the buffer comprises KBF$_4$.

18. The composition of claim 13, wherein a pH of the composition is at least 9.

* * * * *